3,511,465
HEAD-UP DISPLAY SYSTEMS FOR
AIRCRAFT PILOTING
Marcel Morion, Paris, France, assignor to CSF-Compagnie Generale de Telegraphie Sans Fil, a corporation of France
Filed June 4, 1968, Ser. No. 734,319
Claims priority, application France, June 8, 1967, 109,665
Int. Cl. B61r 1/10
U.S. Cl. 248—479      7 Claims

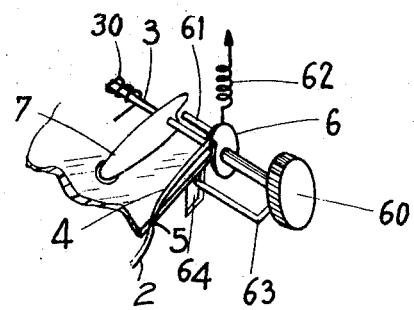
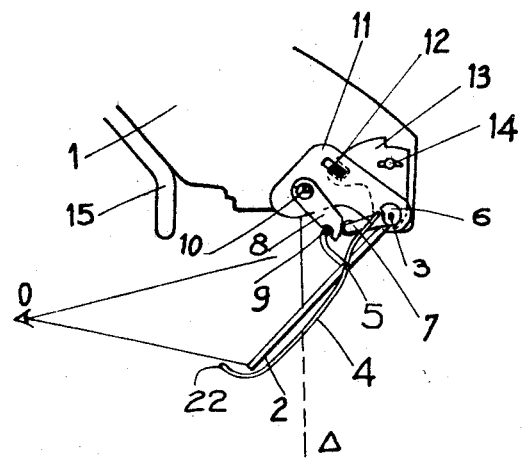
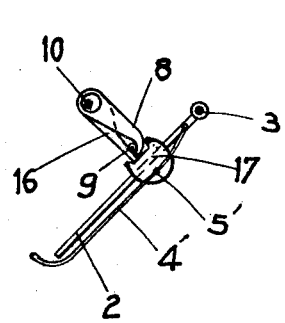
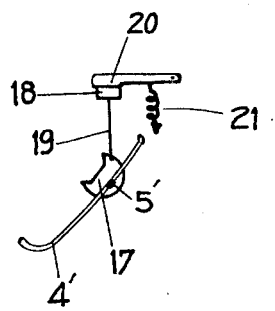
Fig. 1b
Fig. 1a
Fig. 2
Fig. 3

ABSTRACT OF THE DISCLOSURE

A combined arrangement for insuring the security of a pilot with respect to the semi-reflecting mirror of a head-up display system and for adjusting the position of this mirror, which is pivotally mounted on the body of this head-up display system, comprises a lock for maintaining this mirror and means for maintaining this lock in the working position when no pressure is exerted on this means. A support is fixed by a pawl in at least two positions to a supporting part fixed to the body of the head-up display system and the lock is pivotally mounted on this support by an adjustable eccentric.

---

The present invention relates to head-up display systems for use as piloting aid in an aircraft, which are adapted to present to the pilot, in his outside field of vision, a set of luminous marks which are positionally controlled and projected at infinity.

The luminous image which is seen thus together with the outside objects supply the pilot with the information necessary to pilot the aircraft.

Such head-up display systems comprise generally a collimating head for projecting at infinity images of a series of reticles, which images form the luminous references which the pilot sees at infinity in the direction of flight. This collimating head comprises in particular a semi-reflecting mirror set substantially at 45° to the axis of the plane and which is used for superimposing the luminous reference marks on the landscape viewed in front of the cockpit.

In order to ensure the comfort of the pilot's vision, it is necessary to place this semi-reflecting mirror as near as possible to the eyes of the pilot, which makes possible a binocular vision of the luminous marks or at least of the most important ones and avoids to the pilot the necessity of keeping his head motionless.

This near position of the mirror may be a cause of shocks on the pilot's head due to certain spontaneous or occasioned displacements. Such accidents may be extremely damaging if the mirror is hard, heavy and rigid, as is generally the case.

It is an object of the invention to avoid this danger.

The invention relates therefore to a safety arrangement which avoids the risk of injury, which might be caused by an impact between the pilot's head and the semi-reflecting mirror. It also combines this safety device with control means permitting an accurate positioning of the mirror relative to the cockpit thus allowing an easy control of the descent path.

According to the invention, there is provided a combined arrangement for insuring the security of a pilot with respect to the semi-reflecting mirror of a head-up display system and for adjusting the position of said mirror with respect to the body of said head-up display system, said arrangement comprising: means for mounting said mirror on said body pivotally about an axis perpendicular to the direction of vision of the pilot through said mirror; a lock for maintaining said mirror in a working position upon said lock engaging said mirror; first means for controlling said lock; second means for releasing said first means upon a pressure being exerted on said second means; a supporting member pivotally mounted about said axis; third means comprising an eccentric for pivotally mounting said lock on said supporting member; a support fixed to said body; a pawl for selectively fixing said supporting member to said support in at least two predetermined positions; and a spring for causing said mirror to pivot about said axis away from the pilot upon said lock being set free by said first means.

For a better understanding of the invention and to show how the same may be carried into effect, reference will be made to the drawings accompanying the following description and in which:

FIG. 1a shows diagrammatically the device according to the invention as seen laterally from the right with respect to the direction of flight.

FIG. 1b shows in perspective a detail of the device of FIG. 1a;

FIG. 2 shows a further embodiment of a part of the device according to the invention; and FIG. 3 shows a third embodiment of the same part.

FIG. 1a shows diagrammatically the body 1 of the collimating head of a head-up display system, fixed to the ceiling of the cockpit so that the light beam along the optical axis Δ of the collimator, before reflection upon the semi-transparent mirror 2, is substantially perpendicular to the axis of the aircraft. The semi-reflecting mirror 2 is pivotally mounted on the body 1 by means of a shaft 3, perpendicular to the optical axis Δ. The mirror 2 is located by a spring 30 (FIG. 1b) which tends to cause it to pivot towards the front of the aircraft, i.e., towards the right in the drawing. It is held in the working position by a lock 8 engaging a lug 9, rigidly associated with the frame of the mirror 2. This lock 8 is loaded in the disengaging direction by a spring and retained in the locking position by an arm 7, loaded in its turn by a spring into the locking direction. A cam 6, carrying a knob 60, is mounted on a bushing for rotation about the shaft 3 and is held in the working position by a lever 4. The lever 4 is pivotally mounted near its centre of gravity (so that it does not respond to accelerations) about a pin 5, rigidly associated with the mirror. This lever is so profiled that it does not obstruct the vision and has an extension having a soft coating and positioned in front of the mirror to anticipate the possible impact of the pilot's head on the mirror. It is held in the operating position of the mirror by a weak spring (not shown). The cam 6 carries a finger 61 (FIG. 1b) which extends toward a projecting part of the arm 7. This cam 6 is loaded by a spring 62 in the direction of the arrow of FIG. 1b. The knob 60 carries a lug 63 which extends into an eyelet 64 fixed to the mirror frame. This eyelet allows a certain amount of motion of the knob relative to the mirror.

The lock 8 is mounted on a supporting member 11 which is pivotally mounted on the shaft 3. This lock is pivotally mounted on an eccentric 10 pivoting about its axis in a self-braking bushing. The support may, by means of a pawl 12, be held in two different positions with respect to a supporting member 13, which is pivotally mounted on the collimating head on the shaft 3 and may be given slightly different positions by means of a screw 14 and oblong slots.

The operation of the safety device is as follows, starting from the operating position shown in FIGS. 1a and 1b.

When a pressure is applied in the direction of an impact with the mirror, which it is desired to avoid, which pressure is exerted on the extension of the lever 4, this lever pivots about the axis 5, thus freeing the cam 6 which is rigidly connected to the knob 60. The finger 61 knocks the arm 7 under the action of the spring 62, the eyelet 64 permitting a sufficient displacement of the knob 60 and of the cam 6 to allow this movement. The arm 7 frees in turn the lock 8 which releases the lug 9, thus allowing the mirror 2 to pivot forwards about the axis 3 under the action of a strong spring 30. At the end of the movement, the mirror is braked and finally stopped by a stop pawl (not shown).

The resetting into the operating position is effected by disengaging the mirror from the stop pawl and returning it into its operating position by means of the knob 60 which is rotated to this effect about the shaft 3, which movement has the effect of tensioning again the different springs concerned.

The mirror may also be put in its inoperative position by means of the pawl 12 which to this effect is caused to engage the first notch on the part 13.

The mirror is then substantially horizontal and the protecting pad 15 masks the bevel of the mirror 2 and the lever 4.

In the operating position, the mirror is positioned substantially at 45° relative to the aircraft axis.

The collimating head is in a fixed position in the aircraft, but of course, the place where it is mounted may differ slightly according to the type of aircraft and according to the construction tolerances.

This affects the position of the mirror relative to the axis of the aircraft. By means of the screw 14, the position of the adjustable member 13 may be suitably adapted. It is thus possible in a simple manner to enlarge the manufacturing tolerances of the mounting of the collimator and possibly even do away altogether with devices for adjusting position of the same.

Amongst the luminous marks supplied to the pilot by the collimating head is an artificial horizon which normally indicates to the pilot by comparison with another luminous mark, the position of the horizon relative to the axis of the aircraft (in the case where the reproduction of the longitudinal attitude of the aircraft is made at 1:1 scale in the collimator). When the axis of the aircraft is horizontal, these two markings are at the same height. By means of the eccentric 10, which is controlled by a graduated knob, one can change the inclination angle of the semi-reflecting mirror 2, thus moving vertically by the same amount all the luminous marks displayed and especially the artificial horizon. It is thus possible to have an easy reference for following a trajectory having a given slope. Actually, when by means of the eccentric 10 the artificial horizon has been made to coincide with a given object or mark on the ground (for example, the entry end of the landing runway) it suffices to maintain this alignment for the aircraft, in order to descend towards this mark along a glide path with a constant slope equal to the change in the inclination indicated by the graduated button.

Of course, without departing from the scope of the invention, the collimating head may be equipped with a drift compensating device. In this case, the semi-reflecting mirror must be mounted on a cradle pivoting about the axis Δ. It suffices therefore that the axis 3, the part 13 and through them the whole of the system described should be fixed not to the body of the collimating head itself, but to a cradle or rocker.

FIGS. 2 and 3 show modifications of the safety device of the invention which increase the rapidity of the reaction of the safety device. The same reference numerals are used for the same elements as in FIG. 1.

In FIG. 2, the lock 8 is held in place by a part 17, pivotally mounted about an axis 5' integral with the retaining lever 4'. The latter is either pivotally mounted on the frame of the mirror at one end, its other end being then free to pivot about the former end counteracting the action of a spring, or rigidly, in which case it is formed by a spring plate. In the operating position, the rotation of the part 17 about the axis 5' is prevented by a finger 16. The operation is obvious. Upon an impact on the end of the lever 4', the part 17 moves away from the lock 8 and from the finger 16. Simultaneously it pivots about the axis 5' and frees the lock 8 which frees immediately the mirror 2.

FIG. 3 shows a modification of the device of FIG. 2 which still improves the security against the shocks for example in the case of sudden braking of the aircraft. Here an auxiliary inertia device is used, comprising a weight 18 fixed to the part 17 by an elastic plate 19. The displacement of this weight is damped by a friction system 20, maintained in contact with the weight by a spring 21 so that it does not respond to small amplitude acceleration changes. In the case of a large amplitude change in the acceleration in direction liable to cause a shock, the action of the weight is added to the movement of the lever 4' and accelerates the rotation of the part 17 about the axis 5' and thus in the pivoting of the mirror.

Of course, the invention is not limited to the embodiments described which were given solely by way of examples. In particular, it is possible to avoid any necessity of actual contact between the pilot's head and the extension of lever 4 or 4' by using a photocell system.

What is claimed, is:

1. A combined arrangement for insuring the security of a pilot with respect to the semi-reflecting mirror of a head-up display system and for adjusting the position of said mirror with respect to the body of said head-up display system, said arrangement comprising: means for mounting said mirror on said body pivotally about an axis perpendicular to the direction of vision of the pilot through said mirror; a lock for maintaining said mirror in a working position upon said look engaging said mirror; first means for controlling said lock; second means for releasing said first means upon a pressure being exerted on said second means; a supporting member pivotally mounted about said axis; third means comprising an eccentric for pivotally mounting said lock on said supporting member; a support fixed to said body; a pawl for selectively fixing said supporting member to said support in at least two predetermined positions; and a spring for causing said mirror to pivot about said axis away from the pilot upon said lock being set free by said first means.

2. An arrangement as claimed in claim 1, wherein said third means comprise an eccentric pivotally mounted on a self-braking bushing rigidly mounted on said supporting member.

3. An arrangement as claimed in claim 2, wherein said first means comprise: a pivotal arm for retaining said lock in the locking position; a pivotally mounted cam carrying a finger extending towards said arm for cooperating therewith; and a further spring for loading said cam.

4. An arrangement as claimed in claim 3, wherein said first means further comprise a knob rigidly connected to said cam and carrying a lug extending into an eyelet fixed to said mirror, said cam and said arm being mounted for rotation about said axis.

5. An arrangement as claimed in claim 4, wherein said second means comprise a lever pivotally mounted on said mirror and having at one end a soft coated extention positioned in front of said mirror and an other end for cooperating with said cam.

6. An arrangement as claimed in claim 2, wherein said second means comprise a lever mounted, at one end, on said mirror and having, at the other end, a soft coated extension positioned in front of said mirror; said first means comprise a retaining part pivotally mounted on said lever for retaining said lock in the locking position; and a finger for preventing said part from rotating when said lever and said mirror are in the working position.

7. An arrangement as claimed in claim 6, wherein said first means further comprise: a weight; an elastic plate for fixing said weight to said part for accelerating the rotation of said part upon deceleration of the aircraft; and friction means for damping the movements of said weight for said weight not to respond to vibrations and acceleration changes of small amplitude.

References Cited

UNITED STATES PATENTS 2,357,720   9/1944   Quintile _____ 248—479

ROY D. FRAZIER, Primary Examiner

F. DOMOTOR, Assistant Examiner